US007779668B2

(12) United States Patent
Leck et al.

(10) Patent No.: US 7,779,668 B2
(45) Date of Patent: Aug. 24, 2010

(54) DETECTABLE REFRIGERANT COMPOSITIONS AND USES THEREOF

(75) Inventors: Thomas J. Leck, Hockessin, DE (US); Mack McFarland, West Grove, PA (US); Barbara Haviland Minor, Elkton, MD (US); John Carl Steichen, Landenberg, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/414,022

(22) Filed: Mar. 30, 2009

(65) Prior Publication Data

US 2009/0189077 A1   Jul. 30, 2009

Related U.S. Application Data

(62) Division of application No. 10/984,530, filed on Nov. 9, 2004, now abandoned.

(60) Provisional application No. 60/519,790, filed on Nov. 13, 2003.

(51) Int. Cl.
*G01N 27/00* (2006.01)
(52) U.S. Cl. ........................................ 73/23.2
(58) Field of Classification Search .............. 73/23.2, 73/31.05
See application file for complete search history.

(56) References Cited

U.S. PATENT DOCUMENTS

| | | | |
|---|---|---|---|
| 3,901,672 A | 8/1975 | Roverts | |
| 4,294,716 A | 10/1981 | Saccavino | |
| 4,488,118 A | 12/1984 | Jeffers et al. | |
| 4,609,875 A | 9/1986 | Jeffers | |
| 5,064,560 A | 11/1991 | Merchant et al. | |
| 5,264,833 A | 11/1993 | Jeffers et al. | |
| 5,351,037 A | 9/1994 | Martell et al. | |
| 5,371,467 A | 12/1994 | Jeffers | |
| 5,393,979 A | 2/1995 | Hsi | |
| 5,421,192 A | 6/1995 | Henry et al. | |
| 5,454,966 A * | 10/1995 | Thomas et al. ............. | 252/68 |
| 5,932,176 A | 8/1999 | Yannopoulos et al. | |
| 6,076,372 A | 6/2000 | Acharya et al. | |
| 6,100,229 A | 8/2000 | Swan et al. | |
| 6,148,634 A * | 11/2000 | Sherwood .................. | 62/434 |
| 6,178,809 B1 | 1/2001 | Cavestri | |
| 6,333,632 B1 | 12/2001 | Yang et al. | |
| 6,373,056 B1 | 4/2002 | Johnson et al. | |
| 6,498,046 B2 | 12/2002 | McCarron et al. | |
| 6,526,674 B1 | 3/2003 | Fielding et al. | |
| 6,528,792 B2 | 3/2003 | Johnson et al. | |
| 6,571,565 B2 | 6/2003 | Herrick et al. | |
| 2002/0066555 A1 | 6/2002 | Mulder | |
| 2002/0121440 A1 | 9/2002 | Morris | |
| 2002/0162343 A1 | 11/2002 | Herrick et al. | |
| 2003/0010093 A1 | 1/2003 | Barjesteh | |
| 2003/0046975 A1 | 3/2003 | Wewers et al. | |
| 2003/0074903 A1 | 4/2003 | Upadhye et al. | |
| 2003/0178597 A1 | 9/2003 | Cho | |
| 2004/0005589 A1 | 1/2004 | Birch et al. | |
| 2004/0006321 A1 | 1/2004 | Cheng et al. | |
| 2004/0012628 A1 | 1/2004 | Kropf et al. | |
| 2004/0013571 A1 * | 1/2004 | Morris ....................... | 422/94 |
| 2005/0006387 A1 | 1/2005 | Jackson | |

FOREIGN PATENT DOCUMENTS

| | | |
|---|---|---|
| DE | 41 16 274 A1 | 11/1992 |
| EP | 0 319 133 A2 | 6/1999 |
| EP | 1 013 738 A2 | 6/2000 |
| WO | 0233393 A2 | 4/2002 |
| WO | 03006984 A1 | 1/2003 |
| WO | 03050511 A1 | 6/2003 |
| WO | 03087811 A1 | 10/2003 |

OTHER PUBLICATIONS

International Search Report; Date of Mailing: Apr. 18, 2005.
Written Opinion of the International Searching Authority; Date of Mailing: Apr. 18, 2005.
U.S. Appl. No. 60/457,754, filed Mar. 26, 2003.
U.S. Appl. No. 10/406,970, filed Oct. 14, 2003.
Derwent Abstract XP 002323829 of JP 57 013687; Jan. 26, 1983; Showa Denko KK.
Derwent Abstract XP 002323840 of JP 08 245952; Sep. 24, 1996; Daikin.
Trane, "TruSense(TM) BAS Refrigerant Sensor" www.trane.com/commercial/upkeep/aftermarket/trusensebas.asp (Oct. 30, 2003).
Manning(TM) Systems, Inc. "Infrared Refrigerant Gas Sensor/Transmitter" (Oct. 30, 2003).
Manning(TM) Systems, Inc., "Portable Gas Detection Products" www.manningsystems.com/Products/Portable_Detection_Systems/Gt-r22/gt-r22.asp (Oct. 30, 2003).

(Continued)

*Primary Examiner*—John Fitzgerald

(57) ABSTRACT

Disclosed herein are detectable refrigerant compositions, comprising from about 0.001 to about 5 weight percent tracer compositions, which are useful to identify leaking in a vapor compression refrigeration and/or air conditioning system. The presence of the tracers make the refrigerant compositions detectable by chemo/electro-active array, corona discharge, heated diode, electrochemical, photoionization, infrared, ultrasonic and electron capture detectors.

4 Claims, No Drawings

OTHER PUBLICATIONS

ATP Factory Direct, "HVAC Products" www.tif.com/cgi-bin/pdc/searchprod.cgi?category=142&type=hvac&tid=2&action+search (Nov. 7, 2003).

The Tool Warehouse, "Refrigerant Leak Detectors" www.thetoolwarehouse.net/shop/TTW50.html (Nov. 7, 2003).

Process Cooling & Equipment, "How to Choose a Leak Detector" by Mike Fleming, Spectronics Corp. www.process-cooling/com/CDA/ArticleInformation/features/BNP_F.../0,3674,00.htm (Nov. 7, 2003).

DuPont, "Advanced Automotive Electrical & Electronics: Sensors" www.automotive.dupont.com/en/scienceAuto/AAEE/components/sensors.html (Oct. 31, 2003).

DuPont Dow Elastomers, Sensor Technology to Help Reduce Vehicle Emissions, (Oct. 31, 2003).

M. Ghodbane, J.A. Baker, W.R. Hill, S.O. Andersen, "R-152a Mobile A/C with Directed Relief Safety System" Jul. 2003 General Motors Presentation.

Notification of Transmittal of the International Preliminary Report on Patentability; Date of Mailing: Mar. 7, 2006.

* cited by examiner

DETECTABLE REFRIGERANT COMPOSITIONS AND USES THEREOF

CROSS REFERENCE(S) TO RELATED APPLICATION(S)

This application is a divisional application of and claims the priority benefit of U.S. patent application Serial No. 10/984,530, filed Nov. 9, 2004, now abandoned, which claims the priority benefit of U.S. Provisional Application 60/519,790, filed Nov. 13, 2003.

FIELD OF THE INVENTION

The present invention relates to detectable refrigerant compositions having tracers that are useful in vapor compression refrigeration systems. The detectable tracers permit detection of the composition upon leaking.

BACKGROUND OF THE INVENTION

Certain highly fluorinated hydrofluorocarbon refrigerants, 1,1,1,2-tetrafluoroethane (HFC-134a) for example, developed in the mid-1980s and commercialized in the early 1990s to replace ozone depleting chlorofluorocarbon (CFC) refrigerants, are coming under increased regulatory pressure due to their relatively high global warming potential (GWP) and purported impact on global warming. Refrigeration and air conditioning industry solutions include designing essentially leak-free hydrofluorocarbon-based refrigeration systems, as well as possibly transitioning from higher GWP to lower GWP refrigerants, including certain hydrofluorocarbons (e.g., 1,1-difluoroethane (HFC-152a)) and hydrocarbons as well as compounds such as carbon dioxide, ammonia, and dimethyl ether. These new solutions are accompanied by concerns related to leak-free designs, as well as concerns around flammability and toxicity of the lower GWP refrigerants. The industry needs to be able to detect and/or differentiate from background gases, and optionally quantify leaking refrigerants as it transitions to lower GWP refrigerants, preferably, doing so accurately, reproducibly and cost effectively.

For example, where the solution involves carbon dioxide used as a refrigerant, detection, differentiating from background (atmospheric) carbon dioxide concentration (which may vary, e.g., in a sealed space depending on occupant respiration, efficiency of combustion and emission control apparatus, etc.), and quantifying leaking carbon dioxide refrigerant is a difficult problem to solve with current apparatus and methods.

Also, where the solution involves 1,1-difluoroethane (HFC-152a) as the working fluid in a sealed vehicle's air conditioning system, detection, differentiating from background 1,1-difluoroethane concentration (which may be separately present due to usage of HFC-152a as aerosol propellant and polymer foam blowing agent), and quantifying leaking 1,1-difluoroethane refrigerant is a difficult problem to solve with currently available apparatus and methods. Some current detectors are also less sensitive to hydrofluorocarbons and have more difficulty detecting HFC leaks than compounds containing chlorine.

The present invention, the use of the compositions of the present invention, and the method for detecting the compositions of the present invention meet the industry needs.

BRIEF SUMMARY OF THE INVENTION

Disclosed herein is a detectable refrigerant composition comprising: at least one refrigerant selected from the group consisting of: hydrofluorocarbon, hydrochlorofluorocarbon, perfluorocarbon, hydrofluorocarbon ether, perfluorocarbon ether, hydrocarbon, carbon dioxide, ammonia, and dimethyl ether, and an effective amount of a tracer wherein said tracer is different from said refrigerant.

Also disclosed is a method of using the refrigerant composition of the present invention to detect its presence wherein said refrigerant is at least one member selected from the group consisting of hydrofluorocarbon, hydrochlorofluorocarbon, perfluorocarbon, hydrofluorocarbon ether, perfluorocarbon ether, hydrocarbon, carbon dioxide, ammonia, and dimethyl ether, said method comprising providing a detector having a means for detecting said tracer in the vicinity of said refrigerant composition.

A further disclosure is a method for analyzing at least one gas component in the detectable refrigerant composition of claim the present invention, said method comprising: providing an array of at least two chemo/electro-active materials, each chemo/electro-active material exhibiting a different electrical response characteristic upon exposure to the individual gas component in said refrigerant than each other chemo/electro-active material; exposing said array to said refrigerant-composition; determining an electrical response of each chemo/electro-active material upon exposure of said array to said refrigerant; and analyzing the individual gas component from the electrical response values.

Another disclosure is a detectable refrigerant composition, wherein said refrigerant is at least one member selected from the group consisting of hydrofluorocarbon, hydrochlorofluorocarbon, perfluorocarbon, hydrofluorocarbon ether, perfluorocarbon ether, hydrocarbon, carbon dioxide, ammonia, and dimethyl ether, and an effective amount of a tracer, to produce a detectable refrigerant composition or to improve the detectability of refrigerant composition, wherein said refrigerant composition is in a vessel, exterior of said vessel having a means for detecting said tracer in said refrigerant-tracer combination.

DETAILED DESCRIPTION OF THE INVENTION

The present invention relates in part to a detectable refrigerant composition comprising at least one refrigerant, and an effective amount of a tracer wherein said tracer is different from said refrigerant. Refrigerant of the present invention is preferred to have a normal boiling point of about 80° C. or less.

The refrigerant of the present invention is at least one refrigerant selected from the group consisting of hydrofluorocarbon, hydrochlorofluorocarbon, perfluorocarbon, hydrofluorocarbon ether, perfluorocarbon ether, hydrocarbon, carbon dioxide, ammonia, and dimethyl ether.

Representative hydrofluorocarbon refrigerants include fluoromethane (HFC-41), difluoromethane (HFC-32), trifluoromethane (HFC-23), fluoroethane (HFC-161), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134) and 1,1,1,2,2-pentafluoroethane (HFC-125).

Representative hydrochlorofluorocarbon refrigerants include chlorodifluoromethane (HCFC-22), 2-chloro-1,1,1-trifluoroethane (HCFC-123), 2-chloro-1,1,1,2-tetrafluoroethane (HCFC-124) and 1-chloro-1,1-difluoroethane (HCFC-142b).

Representative perfluorocarbon refrigerants include tetrafluoromethane (PFC-14), hexafluoroethane (PFC-116), octafluoropropane (PFC-218) and decafluorobutane (PFC-31-10).

Representative hydrofluorocarbon ether refrigerants include $CF_3OCHF_2$ (HFE-125), $CF_3OCH_3$ (HFE-143a), $CF_3OCH_2F$ (HFE-134a), $CHF_2OCHF_2$ (HFC-134), cyclo-$(CF_2CF_2CF_2O-)$ (HFE-c216), $CF_3CF_2OCH_3$ (HFE-245cbEbg), $CHF_2OCHFCF_3$ (HFE-236eaEbg), $CHF_2CF_2OCH_3$ (HFE-254cb2), $C_4F_9OCH_3$ (HFE-7100) and $C_4F_9OC_2H_5$ (HFE-7200).

Representative perfluorocarbon ether refrigerants include $CF_3OCF_3$, $CF_3OC_2F_5$, $C_2F_5OC_2F_5$ and $CF_3OCF(CF_3)CF(CF_3)OCF_3$.

Representative hydrocarbon refrigerants include methane, ethane, propane, cyclopropane, propylene, n-butane, cyclobutane, 2-methylpropane, methylcyclopropane, n-pentane, cyclopentane, 2-methylbutane, methylcyclobutane, 2,2-dimethylpropane and dimethylcyclopropane isomers.

Another aspect of the present invention is wherein said refrigerant composition is in a vessel, exterior of said vessel having either a mobile, transportable, hand-held or stationary means for detecting said tracer in said refrigerant-tracer combination.

In the composition of the present invention the tracer is at least one member selected from the group consisting of $C_{1-5}$ hydrofluorocarbon, $C_{1-2}$ hydrochlorofluorocarbon, $C_{1-4}$ hydrochlorocarbon, $C_{2-6}$ fluoroether, $C_{1-5}$ hydrocarbon, $C_{1-3}$ hydrocarbon alcohol, $C_{1-3}$ hydrocarbon amine, $C_{1-3}$ hydrocarbon mercaptan, $C_{1-4}$ hydrocarbon ether, $C_{3-4}$ hydrocarbon ketone, $C_{3-4}$ bromofluoroketone, $C_{2-4}$ hydrocarbon aldehyde, 1,1,1-trifluorotoluene, p-chloro-1,1,1-trifluorotoluene, sulfur dioxide, nitrogen oxide, ethanolamine, ammonia, perfluoromethyl iodide, and perfluoroethyl iodide.

Representative hydrofluorocarbon tracer compositions of the present invention include fluoromethane (HFC-41), difluoromethane (HFC-32), trifluoromethane (HFC-23), fluoroethane (HFC-161), 1,1-difluoroethane (HFC-152a), 1,1,1-trifluoroethane (HFC-143a), 1,1,1,2-tetrafluoroethane (HFC-134a), 1,1,2,2-tetrafluoroethane (HFC-134), 1,1,1,2,2-pentafluoroethane (HFC-125), 1,1,1,3,3,3-hexafluoropropane (HFC-236fa), 1,1,1,2,3,3,3-heptafluoropropane (HFC-227ea), and 1,1,2,2,3,3,4,4,-octafluorobutane (HFC-338 pcc).

Representative hydrochlorofluorocarbon tracer compositions of the present invention include chlorodifluoromethane (HCFC-22), 2-chloro-1,1,1-trifluoroethane (HCFC-123), 2-chloro-1,1,1,2-tetrafluoroethane (HCFC-124) and 1-chloro-1,1-difluoroethane (HCFC-142b).

Representative hydrochlorocarbon tracer compositions of the present invention include methyl chloride, methylene chloride, ethyl chloride, trans-1,2-dichloroethylene, 1-propyl chloride and 2-propyl chloride.

Representative fluoroether tracer compositions of the present invention include $CF_3OCHF_2$ (HFE-125), $CF_3OCH_3$ (HFE-143a), $CF_3OCH_2F$ (HFE-134a), $CHF_2OCHF_2$ (HFC-134), cyclo-$(CF_2CF_2CF_2O-)$ (HFE-c216), $CF_3CF_2OCH_3$ (HFE-245cbEbg), $CHF_2OCHFCF_3$ (HFE-236eaEbg); $C_4F_9OCH_3$ (HFE-7100) and $C_4F_9OC_2H_5$ (HFE-7200).

Representative hydrocarbon tracer compositions of the present invention include methane, ethane, propane, cyclopropane, propylene, n-butane, cyclobutane, 2-methylpropane, methylcyclopropane, n-pentane, cyclopentane, 2-methylbutane, methylcyclobutane, 2,2-dimethylpropane and dimethylcyclopropane isomers.

Representative hydrocarbon alcohol tracer compositions of the present invention methanol, ethanol, 1-propanol and 2-propanol.

Representative hydrocarbon amine tracer compositions of the present invention are methyl amine or ethyl amine, A representative hydrocarbon mercaptan tracer composition of the present invention is ethyl mercaptan.

Representative hydrocarbon ether tracer compositions of the present invention include dimethyl ether, ethyl methyl ether and diethyl ether.

Representative hydrocarbon ketone tracer compositions of the present invention include propanone and butanone, Representative bromofluoroketone tracer compositions of the present invention are selected from the group consisting of $CF_3C(O)CBrFCF_2CF_3$;

$CF_3C(O)CF_2CF_2CBrF_2$;

$CBrF_2C(O)CF(CF_3)_2$;

$CF_3C(O)CBr(CF_3)_2$;

$CBrF_2CF_2C(O)CF_2CF_3$;

$CF_3CBrFC(O)CF_2CF_3$;

$CF_3CBrFC(O)CF_2CF_2CF_3$;

$CF_3CF_2C(O)CBrFCF_2CF_3$;

$CF_3CF_2C(O)CF_2CF_2CBrF_2$;

$CF_3C(O)CBr(CF_3)CF_2CF_3$;

$CF_3C(O)CF(CF_3)CBrFCF_3$;

$CF_3C(O)CBrFCF_2CF_2CF_3$;

$CF_3C(O)CF_2CF_2CF_2CF_2CBrF_2$;

$CF_3CBrFC(O)CF_2CF_2CF_3$;

$CF_3CF_2C(O)CBrFCF_2CF_3$;

$CF_3CF_2C(O)CF_2CF_2CBrF_2$;

$CF_3CF_2CBrFC(O)CF_2CF_3$;

$CBrF_2CF_2C(O)CF(CF_3)CF_2CF_3$;

$CF_3CBrFC(O)CF(CF_3)CF_2CF_3$;

$CF_3CF_2C(O)CBr(CF_3)CF_2CF_3$;

$CF_3CF_2C(O)CF(CBrF_2)CF_2CF_3$;

$CBrF_2CF_2CF_2C(O)CF(CF_3)_2$;

$CF_3CF_2CBrFC(O)CF(CF_3)_2$;

$CF_3CF_2CF_2C(O)CBr(CF_3)_2$;

$(CF_3)_2CBrC(O)CF(CF_3)_2$;

$CF_3CBrFCF_2C(O)CF(CF_3)_2$;

$CHF_2CF_2C(O)CBr(CF_3)_2$;

$(CF_3)_2CHC(O)CBr(CF_3)_2$;

$CHF_2CF_2C(O)CBrFCF_3$;

$(CF_3)_2CHC(O)CBrFCF_3$;

$(CF_3)_2CHC(O)CBrF_2$;

$CBrF_2CF_2C(O)CH(CF_3)_2$;

$CBrF_2C(O)CF(CF_3)OCF_3$;

$CBrF_2CF_2C(O)CF(CF_3)OCF_3$;

$CBrF_2CF_2CF_2C(O)CF(CF_3)OCF_3$;

$CBrF_2C(O)CF(CF_3)OC_2F_5$;

$CBrF_2CF_2C(O)CF(CF_3)OC_2F_5$;

$CBrF_2C(O)CF(CF_3)OCF_2C_2F_5$;

$CBrF_2CF_2C(O)CF(CF_3)OCF_2C_2F_5$;

$CBrF_2C(O)CF(CF_3)OCF(CF_3)_2$;

$CBrF_2CF_2C(O)CF(CF_3)OCF(CF_3)_2$;

$CF_3CBrFC(O)CF(CF_3)OCF(CF_3)_2$;

$CF_3CBrFC(O)CF(CF_3)OCF_3$;

$CF_3CBrFC(O)CF(CF_3)OC_2F_5$;

$CF_3CBrFC(O)CF(CF_3)OCF_3$;

$(CF_3)_2CBrC(O)CF(CF_3)OCF_3$;

$CF_3CBrFC(O)CF(CF_3)OC_2F_5$;

$(CF_3)_2CBrC(O)CF(CF_3)OC_2F_5$;

$CF_3CBrFC(O)CF(CF_3)OCF_2C_2F_5$;

$CF_3CBrFC(O)CF(CF_3)OCF(CF_3)_2$;

$CBrF_2C(O)CF(OCF_2CHF_2)CF_3$;

$CBrF_2C(O)CH(OCF_2CHF_2)CF_3$;

$CBrF_2C(O)CF(OCH_3)CF_3$;

$CBrF_2C(O)CF(CF_2OCH_3)CF_3$;

$CClF_2CFBrC(O)CF_2CF_3$;

$CBrF_2CFClC(O)CF_2CF_3$;

$CClF_2CFBrC(O)CF(CF_3)_2$;

$CBrF_2CFClC(O)CF(CF_3)_2$;

$CClF_2CFBrC(O)CF(CF_3)(C_2F_5)$;

$CBrF_2CFClC(O)CF(CF_3)(C_2F_5)$;

$CClF_2C(O)CBr(CF_3)_2$;

$CClF_2CF_2C(O)CBr(CF_3)_2$;

$CF_3CClFC(O)CBr(CF_3)_2$;

$CClF_2C(O)CBrFCF_3$;

$CClF_2CF_2(O)CCBrFCF_3$;

$CF_3CClFC(O)CBrFCF_3$;

$CBrF_2C(O)CCl(CF_3)_2$;

$CBrF_2CF_2C(O)CCl(CF_3)_2$;

$CBrF_2C(O)CClFCF_3$; and $CBrF_2CF_2C(O)CClFCF_3$.

Representative hydrocarbon aldehyde tracer compositions of the present invention are acetaldehyde or propionaldehyde.

Additional tracer compositions of the present invention include sulfur dioxide, and a nitrogen oxide selected from nitric oxide or nitrous oxide.

By effective amount of tracer is meant an amount of at least one tracer component that when combined with refrigerants of the present will result in a detectable refrigerant-tracer mixture. The effective amount of tracer is preferably sufficient to allow for accurate, reproducible, and optionally quantifiable detection of a refrigerant leak. An effective amount of tracer is generally from about 0.001 to about 5 weight percent of tracer, and more preferably from about 0.01 to about 1 weight percent of tracer, based on the total weight of refrigerant and tracer.

The tracer of the present invention has a vapor pressure (neat) at 25° C. of generally from about 0.01 to about 500 times, preferably from about 1 to about 300 times, the vapor pressure at 25° C. of said refrigerant (neat). Tracer is preferably selected for a given refrigerant such that it may be accurately and reproducibly detected in the presence of background gases using an appropriate means for detecting said tracer.

It is acceptable if refrigerant and tracer form a low boiling (maximum pressure) azeotropic or azeotrope-like mixture. Such a mixture is preferred in the instance where refrigerant and an effective amount of tracer, under temperature and pressure conditions where a vessel containing said mixture is leaking, allow for accurate detection of a refrigerant leak, via detection of tracer. Preferred refrigerants are the relatively low GWP compounds difluoromethane (HFC-32), 1,1-difluoroethane (HFC-152a), propane, cyclopropane, propylene, n-butane, 2-methylpropane, carbon dioxide, ammonia, and dimethyl ether. Preferred amongst the tracers include ammonia, nitric oxide, 2-chloro-1,1,1,2-tetrafluoroethane (HCFC-124), 1,1,1,2-tetrafluoroethane (HFC-134a) and dimethyl ether. Where the refrigerant is 1,1-difluoroethane (HFC-152a), the tracer is preferably selected from at least one of ammonia, nitric oxide or dimethyl ether, and the means for detecting tracer is preferably a chemo/electro-active array detector, corona discharge detector, heated electrochemical detector or heated diode detector.

The present invention also relates to a method of using the refrigerant composition of the present invention to detect its presence wherein said refrigerant is at least one member selected from the group consisting of hydrofluorocarbon, hydrochlorofluorocarbon, perfluorocarbon, hydrofluorocarbon ether, perfluorocarbon ether, hydrocarbon, carbon dioxide, ammonia, and dimethyl ether, said method comprising providing a detector having a means for detecting said tracer in the vicinity of said refrigerant composition.

The method described herein may be used to detect leaks in a vapor compression refrigeration or air conditioning system or heat pump system. The detection is carried out by a means for detecting said tracer, wherein in the absence of the tracer component would not be detectable, or at best difficult to detect, or unreliably detectable.

In the method disclosed herein, the means for detecting said tracer is selected from the group consisting of a chemo/electro-active array detector, corona discharge detector, heated diode detector, heated electrochemical detector, photoionization detector, infrared detector, ultrasonic detector and an electron capture detector.

The present invention also relates to a method for analyzing at least one gas component in the detectable refrigerant composition of the present invention, said method comprising: providing an array of at least two chemo/electro-active materials, each chemo/electro-active material exhibiting a different electrical response characteristic upon exposure to the individual gas component in said refrigerant than each other chemo/electro-active material; exposing said array to said refrigerant-composition; determining an electrical response of each chemo/electro-active material upon exposure of said array to said refrigerant; and analyzing the individual gas component from the electrical response values.

The method described herein optionally may further comprise determining a value for the temperature of said refrigerant composition independently of the determination of the electrical responses of the chemo/electro-active materials; optionally, digitizing the electrical responses and the temperature value, so as to permit calculation of a value from the digitized electrical responses and temperature value, and optionally, analyzing the gas component.

Suitable array detectors are described in U.S. patent application Ser. No. 09/977,791, filed Oct. 15, 2001, published US 2002-121,440 and U.S. patent application Ser. No. 10/117,472, filed Apr. 5, 2002, both incorporated herein by reference.

Representative means for detecting tracer include a corona discharge detector as disclosed in U.S. Pat. No. 6,333,632, U.S. Pat. No. 4,609,875 and U.S. Pat. No. 4,488,118, all of which are incorporated herein by reference.

Representative means for detecting tracer include a heated diode detector as disclosed in U.S. Pat. No. 5,932,176, herein incorporated by reference.

Representative means for detecting tracer include a heated electrochemical sensor as disclosed in U.S. Pat. No. 4,400,260, herein incorporated by reference.

Representative means for detecting tracer include a photo-ionization detector as disclosed in U.S. Pat. No. 5,393,979, herein incorporated by reference.

Representative means for detecting tracer include an ultrasonic detector as disclosed in European patent publication EP 0 319 133 A2, herein incorporated by reference.

Representative means for detecting tracer include infrared detectors as disclosed in U.S. Pat. No. 5,528,792 and U.S. Pat. No. 6,373,056, both incorporated herein by reference.

Representative means for detecting tracer further include electron capture detectors.

The present invention involves a method for detecting refrigerant leaking from a vessel. By vessel is meant any sealed vessel containing refrigerant, including but not limited to, lab and commercial scale cylinders, railroad and tractor-trailer tank cars, piping, and vapor compression refrigeration and air conditioning (AC) apparatus and associated piping and storage containers that may be found in stationary (e.g., home or commercial AC) or mobile (e.g., automobile, train, boat, airplane) installations.

EXAMPLES

Example 1

Compositions of the present invention were prepared a suitable container. Comparative compositions that did not contain tracer compositions were also prepared. Compositions were then leaked in the vapor phase in the presence of a hand-held Ritchie Yellow Jacket® Accuprobe® heated electrochemical detector. The digital readout scale was 0 (for no detection) to 9 (for maximum detection). Results are shown below.

| Composition | Detector Digital Reading |
|---|---|
| $CO_2$ | 0 |
| $CO_2$/0.05 wt % trans-1,2-dichloroethylene | 8 |
| $CO_2$/0.1 wt % HFC-152a | 5 |

The data show that addition of tracer enables the detector to detect a CO2 leak, whereas it was unable to detect the leak without tracer present.

Example 2

Compositions of the present invention were prepared in a suitable container. Comparative compositions that did not contain tracer compositions were also prepared. Compositions were then leaked in the vapor phase in the presence of a hand-held TIF Instruments 5650 corona discharge halogen leak detector and the detector reading was recorded based on number of red lights illuminated. Results are shown below.

| Composition | Detector Reading (number of red lights) |
|---|---|
| HFC-134a | 2 |
| HFC-134a/0.1 wt % trans-1,2-dichloroethylene | 4 |
| CO2 | 2 |
| CO2/0.1 wt % HFC-152a | 5 |

The data show that addition of tracer improves the ability of the detector to detect an HFC-134a or $CO_2$ refrigerant leak.

Example 3

Compositions of the present were prepared in a suitable container. Comparative compositions that did not contain tracer compositions were also prepared. Compositions were then leaked in the vapor phase in the presence of a hand-held Ritchie Yellow Jacket® Accuprobe® heated electrochemical detector. The digital readout scale was 0 for no detection to 9 for maximum detection. Results are shown below.

| Composition | Detector Digital Reading |
|---|---|
| HFC-152a | 1 |
| HFC-152a/0.03 wt % trans-1,2-dichloroethylene | 4 |
| HFC-152a/0.1 wt % HCFC-22 | 4 |

The data show that addition of tracer improves the ability of the detector to detect an HFC-152a refrigerant leak.

Example 4

Compositions of the present were prepared in a suitable container. Comparative compositions that did not contain tracer compositions were also prepared. Compositions were then leaked in the vapor phase in the presence of a hand-held TIF Instruments 5650 corona discharge halogen leak detector and the detector reading was recorded based on number of red lights illuminated. Results are shown below.

| Composition | Detector Reading (number of red lights) |
|---|---|
| HFC-152a | 0 |
| HFC-152a/0.03 wt % trans-1,2-dichloroethylene | 6 |
| HFC-152a/0.1% HCFC-22 | 6 |

The data show that addition of tracer enables the detector to detect presence of an HFC-152a leak, whereas it was unable to detect the leak without tracer present.

What is claimed is:

1. A method for analyzing at least one gas component in a detectable refrigerant composition comprising about 95 to about 99.999 weight percent carbon dioxide and about 0.001 to about 5 weight percent of a tracer selected from the group consisting of $C_{1-4}$ hydrochlorocarbons, said method comprising: providing a detector for detecting the refrigerant composition, wherein said detector is selected from the group consisting of a chemo/electro-active array detector, corona discharge detector, heated diode detector, heated electrochemical detector, photoionization detector, infra red detector, ultrasonic detector and an electron capture detector.

2. The method of claim 1, wherein said detector for detecting is selected from the group consisting of a corona discharge detector and a heated electrochemical detector.

3. The method of claim 1 wherein said $C_{1-4}$ hydrochlorocarbon is selected from the group consisting of trans-1,2-dichloroethylene, methyl chloride, methylene chloride, ethyl chloride, 1-propyl chloride, 2-propyl chloride, and mixtures thereof.

4. The method of claim 1, wherein said chemo/electro-active array detector comprises an array of at least two chemo/electro-active materials, each chemo/electro-active material exhibiting a different electrical response characteristic upon exposure to at least one individual gas component in said refrigerant composition than each other chemo/electro-active material.

* * * * *